_United States Patent Office_ 2,749,366
Patented June 5, 1956

2,749,366

PREPARATION OF AROMATIC CARBOXYLIC ACID CHLORIDES FROM AROMATIC COMPOUNDS

Robert E. Foster, New Castle, and Benjamin W. Howk, Wilmington, Del., assignors to E. I. du Pont de Nemours & Company, Wilmington, Del., a corporation of Delaware No Drawing. Application September 10, 1952, Serial No. 308,936

16 Claims. (Cl. 260—544)

This invention relates to a new and improved method for preparing acid chlorides.

According to classical procedures, acid chlorides are obtained by the action of phosphorus pentachloride, phosphorus trichloride, thionyl chloride, or sulfuryl chloride on the corresponding acids. Although these methods produce desired acid chlorides, they are not entirely satisfactory because they require use of easily hydrolyzable inorganic acid chlorides that tend to corrode equipment and are disagreeable and difficult to handle.

More recently J. E. Carnahan and J. W. Hill in their U. S. patent application Serial No. 261,364, filed December 12, 1951, now Patent No. 2,700,679, issued January 25, 1955, have described an improved process for preparing acid chlorides which comprises reacting a carboxylic acid with an alkyl polychloride containing from 1 to 2 carbon atoms and not more than two hydrogens or hydrocarbon radicals on the chlorine-bearing carbons over a selected catalyst, such as a metal molybdite at 100 to 300° C. However, the need for finding routes to acid chlorides that do not involve employment of the corresponding acids as intermediates is still important and pressing.

It is an object of this invention to provide a novel process for preparing carboxylic acid chlorides. A further object is to provide a catalytic method for obtaining the desired acid chlorides in improved yields. An important object is to provide a method for preparing aromatic acid chlorides from aromatic compounds, including aromatic hydrocarbons. Other objects will appear hereinafter.

The objects of this invention are accomplished by the following process for preparing carboxylic acid chlorides which comprises heating and reacting at a temperature in the range of 100° to 375° C., carbon tetrachloride, a carboxylic acid, and an aromatic compound free of carboxyl groups and having at least one hydrogen on the aromatic nucleus in contact with a catalyst which is a reduced tungstic oxide, or which is a metal salt of an acid of the formula $H_2MO_n$, in which $n$ is 2 or 3 and M is molybdenum or tungsten.

In a preferred embodiment, a mixture consisting of the aromatic compound, carboxylic acid, and carbon tetrachloride in essentially 1:1:2 mole ratio is contacted at 100 to 375° C. with a catalyst which is a reduced tungstic oxide, or is a salt of an acid of the formula $H_2MO_n$ in which $n$ is 2 or 3 and M is molybdenum or tungsten, and then the acid chloride formed is separated from the reaction mixture.

This invention is illustrated, but not limited, by the following examples, in which the parts are by weight unless otherwise specified.

Example I

A mixture of 80 g. of benzene, 60 g. of acetic acid, 400 g. of carbon tetrachloride and 25 g. of reduced tungstic oxide was placed in a 1-liter, corrosion-resistant bomb, and heated with agitation at 200° C. and autogenous pressure for six hours. The bomb was cooled to room temperature, vented, and the product was filtered to separate the catalyst. The liquid filtrate was distilled through a small Vigreux column. At atmospheric pressure there was obtained 66.2 g. of liquid boiling at 58–61° C. (N. E. in methanol 198, in water 100) and containing 26 g. of acetyl chloride; also obtained at atmospheric pressure, boiling at 62–76° C., was 201.3 g. of liquid (N. E. in methanol 975, in water 540) which contained 16 g. of acetyl chloride. The total yield of acetyl chloride was 42 g. or 54% of theory. The identity of the acetyl chloride was confirmed by treatment with aniline, yielding acetanilide, M. P. 114–116° C.

The residue from the atmospheric pressure distillation was distilled under reduced pressure. Benzoyl chloride, 80.5 g., 56.3% yield, B. P. 71–74° C./10–12 mm., and a mixture of isophthaloyl and terephthaloyl chloride, 3.0 g., 1.5% yield, B. P. 130–132° C./10 mm. were obtained. The benzoyl chloride was identified by hydrolysis to benzoic acid, M. P. 122–123° C. alone or when mixed with authentic benzoic acid; and by treatment with aniline to yield benzanilide, M. P. 163–4° C. alone or when mixed with an authentic sample of benzanilide. The dibasic acid chloride fraction which consisted of solid and liquid was characterized as follows. The solid, separated by filtration and washed with petroleum ether, was shown to be terephthaloyl chloride, M. P. 82–84° C. alone or mixed with an authentic sample of terephthaloyl chloride, by treatment with methanol to give dimethyl terephthalate, M. P. 140–142° C. alone or mixed with an authentic sample of dimethyl terephthalate. The liquid portion of the fraction was converted to the dimethyl ester by treatment with methanol, followed by precipitation with water. Recrystallization from methanol-water yielded dimethyl isophthalate, M. P. 64–65° C.

Example II

A mixture of 80 g. of benzene, 180 g. of acetic acid, 475 g. of carbon tetrachloride and 25 g. of reduced tungstic oxide was heated with agitation at 250° C. and autogenous pressure for five hours in a corrosion-resistant bomb. There was obtained 99.6 g., 71% yield of benzoyl chloride; a residue of 22.6 g. was not distillable, and no dibasic acid chloride were isolated.

Repetition of the above experiment using nickel molybdite in place of the reduced tungstic oxide yields similar results.

Example III

A mixture of 80 g. of benzene, 120 g. of acetic acid, 635 g. of carbon tetrachloride and 25 g. of reduced tungstic oxide was heated at 235° C. for six hours in a corrosion-resistant bomb. There were obtained 91.7 g., 65% yield, of benzoyl chloride, and 34.5 g., 17% yield, of a mixture of terephthaloyl and isophthaloyl chlorides.

Results similar to the above are obtained using copper tungstite in place of the reduced tungstic oxide.

Example IV

A mixture of 80 g. of benzene, 60 g. of acetic acid, 400 g. of carbon tetrachloride and 5 g. of reduced tungstic oxide was heated as in the above examples at 250° C. for six hours. There were isolated 78.4 g., 55.6% yield, of benzoyl chloride, and 2.6 g., 1.3% yield, of mixed terephthaloyl and isophthaloyl chlorides.

It is possible to employ a small proportion of catalyst as is shown in the above example. However, in the entire absence of a catalyst, no reaction occurs as the following experiment demonstrates.

A mixture of 80 g. of benzene, 60 g. of acetic acid and 400 g. of carbon tetrachloride was heated at 200° C. for six hours in a corrosion-resistant bomb. The initial starting materials were recovered, unchanged; there was no evidence of acid chloride formation.

*Example V*

A mixture of 40 g. of benzene, 60 g. of benzoic acid, 400 g. of carbon tetrachloride and 25 g. of reduced tungstic oxide was heated with agitation at 200° C., for six hours in a corrosion-resistant bomb. There were obtained 59.1 g. of benzoyl chloride (85% yield based on benzoic acid) and 34.5 g. of a mixture of terephthaloyl and isophthaloyl chlorides (34% yield based on benzene).

*Example VI*

A mixture of 40 g. of benzene, 80 g. of terephthalic acid, 480 g. of carbon tetrachloride and 25 g. of reduced tungstic oxide was heated as described above at 235° C. for six hours. There were obtained by distillation of the product mixture, 28.8 g. of benzoyl chloride (41% yield based on benzene), and 140.5 g. of a mixture of terephthaloyl and isophthaloyl chlorides (88% yield based on the sum of terephthalic acid charged and benzene not converted to benzoyl chloride).

*Example VII*

A mixture of 80 g. of benzene, 400 g. of carbon tetrachloride, 88 g. of carbon dioxide (carbonic acid) and 25 g. of reduced tungstic oxide was heated at 200° C. for six hours at autogenous pressure in a corrosion-resistant bomb. The carbon dioxide was converted to phosgene, and benzene was converted to benzoyl chloride in 10% yield (14.9 g.).

*Example VIII*

A mixture of 110 g. of chlorobenzene, 60 g. of acetic acid, 400 g. of carbon tetrachloride and 25 g. of reduced tungstic oxide was heated in a corrosion-resistant bomb at 200° C. for six hours. From the product mixture were isolated 30.6 g. of recovered chlorobenzene and 84.3 g. of p-chlorobenzoyl chloride, B. P. 99–103° C. (12–14 mm.). This corresponds to a 69% yield. The acid chloride was identified by hydrolysis to p-chlorobenzoic acid, M. P. 220–225° C., and by treatment with aniline to yield p-chlorobenzanilide, M. P. 194–197° C.

*Example IX*

A mixture of 92 g. of toluene, 60 g. of acetic acid, 400 g. of carbon tetrachloride and 25 g. of reduced tungstic oxide was heated in a corrosion-resistant bomb at 200° C. for six hours. There were obtained by distillation of the product mixture 35.2 g., 22.8% yield, of mixed toluyl chlorides, B. P. 94–100° C. (13–15 mm.) and 9.0 g., 4% yield, of a dibasic acid chloride, B. P. 130–136° C. (13 mm.).

*Example X*

A mixture of 154 g. of biphenyl, 120 g. of acetic acid, 480 g. of carbon tetrachloride and 25 g. of reduced tungstic oxide was heated at 200° C. for six hours in a corrosion-resistant bomb. The volatile constituents of the product mixture were removed by distillation. A portion of the residue was treated with methanol, and was partially dissolved. A precipitate formed when the methanol solution was diluted with water; recrystallized from methanol, the solid melted at 117–117.5° C. (Literature M. P. of methyl 4-phenylbenzoate is 117° C.). Another portion of the product residue was hydrolyzed by boiling with aqueous sodium hydroxide. The solution was filtered hot; crystals appeared when the filtrate had cooled to room temperature. These crystals were isolated by filtration, redissolved in hot water and acidified, to precipitate 4-phenylbenzoic acid, M. P. 220–222° C. (The melting point of 4-phenylbenzoic acid is reported in the literature to be in the range of 218 to 224° C.).

The soluble portion of the alkaline extract was acidified precipitating mixed acids, M. P. 150–380° C. This mixture was extracted with boiling water, and a mixture of dibasic acids, neutralization equivalent 125, recrystallized from the aqueous extract, M. P. 200–250° C.

*Example XI*

A mixture of 128 g. of naphthalene, 120 g. of acetic acid, 480 g. of carbon tetrachloride and 25 g. of reduced tungstic oxide was heated in a corrosion-resistant bomb at 200° C. for six hours. The product mixture was filtered to remove the catalyst and the volatile solvent and acetyl chloride (obtained in 44% yield) were removed by distillation. The non-distillable residue weighed 168.8 g. and was completely soluble in aqueous sodium hydroxide. This solution was acidified with mineral acid to precipitate the organic acids which were recrystallized from ethanol-water solution. Several crops of crystalline carboxylic acids were obtained, all high melting (250° C. to above 350° C.) and all with neutralization equivalents in the range of 102–115. An anilide derivative prepared from the non-distillable residue did not melt below 350° C. Thus it appears that the products from naphthalene are naphthalene dicarboxylic acid chlorides.

The reduced tungstic oxide catalyst used in the above examples was prepared as follows:

Powdered ammonium paratungstate (472 g.) was added slowly, with stirring to 2500 ml. of water at 90° C. The salt was not completely soluble in this volume of water, but a small amount remained suspended as a slurry.

To this suspension and solution was added, at 85–90° C., with stirring, 600 ml. of 70% nitric acid over a period of one hour. A yellow gelatinous precipitate formed. This slurry was stirred for an hour and allowed to settle for two additional hours. The precipitate was collected on a suction filter and dried at 120–130° C. for two days; it weighed 391 g. The dried material was calcined by heating in a furnace, raising the temperature from room temperature to 350° C. in six hours, and maintaining it at 350° C. for four hours. The yield of the yellow tungstic oxide was 377.8 g. or 93% of theory.

The tungstic oxide prepared above was reduced by placing 184 g. of the oxide in a horizontal glass tube enclosed in an electric furnace. Hydrogen was passed through the tube at a rate of 50 l. per hour. The internal temperature was increased from room temperature to 500° C. over a period of 5½ hours and maintained at 500° C. for 17½ hours. During this period, water was generated from the tungstic oxide, and the oxide became blue, and finally black. The yield of the reduced tungstic oxide, $WO_2$, was 171 g., or 98% of theory.

The process of this invention can be conducted either as a batch, semi-continuous, or continuous, liquid or vapor phase operation.

The particular temperature employed depends upon such interdependent factors as method of operation, materials being reacted, and catalyst. Good results are obtained in the range of 100 to 375° C. but better results from the standpoint of yield of desired product and freedom from excessive side product formation are obtained in the more restricted range of 150° to 300° C. and this therefore embraces the preferred operating temperature conditions.

Pressure is not a critical variable. The process can be carried out under autogenous pressure in a closed reactor, or under externally applied pressure, or at atmospheric pressure. Operation under autogenous pressure is preferred when the process is being carried out batch-wise because the equipment requirements are simple and manipulative problems are minimized.

The essential reactants are a carboxylic acid, an aromatic compound free of carboxyl groups and having at least one hydrogen on the aromatic nucleus and carbon tetrachloride. It is essential that in addition to these reactants there be present a catalyst of the kind more specifically defined hereinafter.

There should preferably be present, in the initial charge, at least a 1:1:2 mole ratio of the reactants, the carboxylic acid, the aromatic compound and carbon tetrachloride. This ratio can be varied however, depending upon the product which is desired. Thus employing more than 2 moles of aromatic compound per mole of carboxylic acid and carbon tetrachloride favors formation of aromatic monocarboxylic acid chloride. On the other hand, increasing the amount of carbon tetrachloride and carboxylic acid favors formation of dicarboxylic acid chlorides.

The aromatic compounds used in the process of this invention are carbocyclic aromatic compounds free of carboxyl groups and having at least one hydrogen on the aromatic nucleus. These aromatic compounds are carbocyclic aromatic compounds having at least one hydrogen attached to the aromatic nucleus with any substituents on the aromatic nucleus being alkyl, alkoxy, nitro, or halogen and include aromatic compounds conforming to the formula RX, in which R is a carbocyclic aromatic radical and X is hydrogen, alkyl, alkoxy, nitro, or halogen. Examples are benzene, toluene, xylene, isopropylbenzene, tertiarybutylbenzene, naphthalene, methylnaphthalene, methoxybenzene, butoxybenzene, dodecyloxybenzene, ethoxynaphthalene, halogenated benzenes, e. g., monochlorobenzene, monochlorotoluenes, mononitrobenzene, and mononitronaphthalene. The preferred aromatic compounds are the carbocyclic aromatic compounds, preferably of 1 or 2 six-membered carbocyclic nuclei, and of these the benzene and the alkyl and alkoxy substituted benzenes are especially preferred.

In the process of this invention there can be used any aliphatic, including cycloaliphatic, monocarboxylic acid and aromatic mono- and dicarboxylic acids. Examples are acetic, propionic, butyric, lauric, tetradecanoic, octadecanoic, linoleic, etc., benzoic, toluic, o-phthalic, etc., hexahydrobenzoic and the like. The preferred acids are those conforming to the general formula RCOOH in which R is an alkyl radical, preferably of 1 to 18 carbon atoms, or an aryl radical, preferably of not more than 12 carbon atoms.

The catalysts used in the practice of this invention are those which are a reduced tungstic oxide, or which are metal salts of an acid of the general formula $H_2MO_n$ in which $n$ is 2 or 3 and M is tungsten or molybdenum.

One class of catalyst of the above kind are the metal molybdites disclosed and claimed in U. S. Patent 2.572,300 issued to H. R. Arnold and J. E. Carnahan. These molybdites exist in two series, in the first the molybdenum is present in the quadrivalent state corresponding to the oxide $MoO_2$ and the hypothetic acid $H_2MoO_3$, and in the second the molybdenum is present in the bivalent state corresponding to the oxide MoO and the hypothetic acid $H_2MoO_2$. Examples of these molybdites are copper molybdite, $CuMoO_3$, nickel molybdite $NiMoO_2$, and cobalt molybdite, $CoMoO_2$ and $CoMoO_3$.

These molybdites may contain promoters or modifiers and may be employed in the form of pellets, or as finely divided powders, and they may be used as such or extended on inert supports such as charcoal, alumina, silica, etc. The particular physical form of the catalyst for maximum activity depends upon the conditions under which the hydrogenation reaction is to be conducted. Thus, for continuous operation it is best to have the catalyst in the form of pellets to minimize mechanical losses. If the process is to be operated as a batch operation, it is best that the catalyst be in finely divided form because in that way maximum catalyst activity is obtained. These molybdites may be blended with tungstites of the type disclosed and claimed in the copending application of H. R. Arnold and J. E. Carnahan, U. S. Serial No. 208,662, filed January 30, 1951, now U. S. Patent 2,702,232, issued February 15, 1955.

The preparation of a nickel molybdite catalyst is illustrated below:

Seventeen-hundred sixty-six grams of ammonium paramolybdate [$(NH_4)_6Mo_7O_{24} \cdot 4H_2O$], equivalent to 10 moles of $MoO_3$, was dissolved in 5000 cc. of distilled water and neutralized by the addition of 900 cc. of 28% aqueous ammonia. The resulting solution of ammonium molybdate [$(NH_4)_2MoO_4$] containing 1.9 moles of excess ammonia was then added, with stirring, at room temperature to a solution of nickel nitrate, prepared by dissolving 2908 grams of nickel nitrate hexahydrate $Ni(NO_3)_2 6H_2O$, equivalent to 10 moles of nickel, in 5000 cc. of distilled water. A pale green precipitate was formed in an acid slurry having a pH of approximately 4 by alkaline-acid paper. The pH of the slurry was adjusted to 7 (Beckman pH meter) by the addition of 500 cc. of 28% aqueous ammonia. The precipitate was then cooled, filtered, dried, and calcined at 400° C. for 18 hours. The calcined product, by analysis, was found to contain 23.2% nickel and 46.4% molybdenum. The calcined product was reduced in hydrogen at gradually increasing temperatures up to 550° C. The reduced product was highly pyrophoric and glowed on exposure to air. Analysis showed the reduced product to contain 26.66% nickel and 33.1% molybdenum, corresponding to $NiMoO_2 \cdot O \cdot 2MoO_3$.

Another class of catalyst are the tungstites disclosed and claimed in the copending application of H. R. Arnold and J. E. Carnahan, U. S. Serial No. 208,662, filed January 30, 1951, now U. S. Patent 2,702,232, issued February 15, 1955. These are metal salts of one of the acids $H_2WO_2$ and $H_2WO_3$. These tungstites are obtained by reacting in the presence of excess ammonia stoichiometric proportions of ammonium tungstate with a water-soluble salt of the metal whose tungstite is desired, washing the precipitate which forms, filtering it, drying it, and then calcining it for from 4 to 24 hours at 350° to 550° C. The calcined material, in granular or powdered form is then reduced in a hydrogen-containing atmosphere for from 5 to 100 hours at gradually increasing temperatures ranging from normal room temperature up to 550° C.

To prepare nickel tungstite, 4 moles of ammonium tungstate, $(NH_4)_2WO_4$, in a 10% aqueous solution, prepared by dissolving 1080 grams of ammonium paratungstate, $(NH_4)_6W_7O_{24} \cdot 6H_2$, in 7000 grams of water and 310 grams of 28% aqueous ammonia at 85° C., was added with stirring to 4 moles of nickel nitrate in a 16% solution, prepared by dissolving 1163 grams of $$Ni(NO_3)_2 \cdot 6H_2O$$

in 6000 grams of water at 85° C. A pale green precipitate was formed in a slurry having a pH of approximately 6. The pH of the slurry was adjusted to 7 at 75° C. by addition of 404 grams of 28% aqueous ammonia. The resulting precipitate was washed, filtered, dried, and calcined at 400° C. The product thus obtained was charged into a furnace and heat-treated at 400° C. in a stream of nitrogen at a space velocity of 390 volumes of gas per volume of catalyst per hour for 12 hours, cooled to room temperature in nitrogen, and the product then reduced for 24 to 47 hours at 450° to 480° C. in hydrogen at a space velocity of 600 to 1000 volumes of gas per volume of catalyst per hour. The reduced product corresponded by analysis to nickel tungstite ($NiWO_2$) containing a slight excess of $W_2O_3$.

The tungsten-containing catalysts are especially valuable because they also bring about substitution reactions which place new carboxyl groups on the aromatic ring and yield polyacyl chlorides.

The amount of catalyst used depends upon such interdependent variables as temperature, pressure, general method of operation, catalyst activity, etc. As a rule, in batch operation the amount of catalyst employed will be between 2 and 10% and preferably between 2.5% and 5% by weight of the reactants. In continuous liquid or vapor phase operation the amount of catalyst is considerably greater than the amount of material being processed at any one time. However, the total weight of material processed during the active life of the catalyst is generally much greater than the catalyst weight.

The time of reaction depends upon the conditions employed and upon the nature of the reactants. As a rule, from 2 to 10 hours will be adequate. However, since prolongation of the reaction beyond the time required to bring about the desired results adds to costs, it is to be avoided. Usually the reaction is permitted to proceed for at least 2 hours because a lesser time is insufficient to bring about complete reaction even under the most favorable conditions. Ten hours represent an upper time limit because the amount of reaction occurring beyond this point is insufficient to compensate for the added labor and equipment costs.

The process of this invention is an advance over prior methods in making it possible to obtain better yields of acid chlorides and especially in providing an economic and feasible synthesis of aromatic acid chlorides.

As many apparently widely different embodiments of this invention may be made without departing from the spirit and scope thereof, it is to be understood that this invention is not limited to the specific embodiments thereof except as defined in the appended claims.

We claim:

1. A process for preparing aromatic carboxylic acid chlorides which comprises heating and reacting, at a temperature in the range of 100° to 375° C., carbon tetrachloride, a carbocyclic aromatic compound, free of carboxyl groups, containing from 1 to 2 six-membered carbocyclic nuclei and having at least one hydrogen on the aromatic nucleus, and a carboxylic acid selected from the class consisting of aliphatic monocarboxylic acids and carbocyclic aromatic carboxylic acids of 1 to 2 carboxyl groups, in contact with a catalyst selected from the class consisting of reduced tungstic oxide, nickel molybdite and copper tungstite.

2. A process for preparing aromatic carboxylic acid chlorides as set forth in claim 1 wherein said catalyst is reduced tungstic oxide.

3. A process for preparing aromatic carboxylic acid chlorides as set forth in claim 1 wherein said carboxylic acid is a mononuclear carbocyclic aromatic carboxylic acid of 1 to 2 carboxyl groups.

4. A process for preparing aromatic carboxylic acid chlorides as set forth in claim 1 wherein said carboxylic acid is terephthalic acid.

5. A process for preparing aromatic carboxylic acid chlorides as set forth in claim 1 wherein said carboxylic acid is benzoic acid.

6. A process for preparing aromatic carboxylic acid chlorides as set forth in claim 1 wherein said carboxylic acid is an aliphatic monocarboxylic acid.

7. A process for preparing aromatic carboxylic acid chlorides as set forth in claim 1 wherein said carboxylic acid is an alkyl monocarboxylic acid.

8. A process for preparing aromatic carboxylic acid chlorides as set forth in claim 1 wherein said carboxylic acid is acetic acid.

9. A process for preparing aromatic carboxylic acid chlorides as set forth in claim 1 wherein said carbocyclic aromatic compound is benzene.

10. A process for preparing aromatic carboxylic acid chlorides which comprises heating and reacting, at a temperature in the range of 100° to 375° C., carbon tetrachloride, a mononuclear carbocyclic aromatic compound which is entirely hydrocarbon and has at least one hydrogen on the aromatic nucleus, and terephthalic acid, in contact with a reduced tungstic oxide catalyst.

11. A process for preparing a chlorobenzoyl chloride which comprises heating and reacting, at a temperature of 100° to 375° C., carbon tetrachloride, a chlorinated benzene, and an aliphatic monocarboxylic acid, in contact with a reduced tungstic oxide catalyst.

12. A process for preparing p-chlorobenzoyl chloride which comprises heating and reacting at a temperature in the range of 150° to 300° C., carbon tetrachloride, acetic acid and chlorobenzene in contact with a reduced tungstic oxide catalyst.

13. A process for preparing aromatic carboxylic acid chlorides which comprises heating and reacting at a temperature in the range of 150° to 300° C., carbon tetrachloride, benzene and benzoic acid in contact with a reduced tungstic oxide catalyst.

14. A process for preparing aromatic carboxylic acid chlorides which comprises heating and reacting at a temperature in the range of 150° to 300° C., carbon tetrachloride, benzene and acetic acid in contact with a reduced tungstic oxide catalyst.

15. A process for preparing aromatic carboxylic acid chlorides which comprises heating and reacting at a temperature in the range of 150° to 300° C., carbon tetrachloride, benzene and terephthalic acid in contact with a reduced tungstic oxide catalyst.

16. A process for preparing aromatic dicarboxylic acid chlorides which comprises heating and reacting at a temperature in the range of 150° to 300° C., carbon tetrachloride, naphthalene, and acetic acid in contact with a reduced tungstic oxide catalyst.

References Cited in the file of this patent

UNITED STATES PATENTS

| 1,921,767 | Mills | Aug. 8, 1933 |
| 1,963,748 | Kyrides | June 19, 1934 |
| 1,963,749 | Kyrides | June 19, 1934 |
| 2,051,096 | Mares | Aug. 18, 1936 |
| 2,062,344 | Wiezevich et al. | Dec. 1, 1936 |
| 2,378,048 | Theobald et al. | June 12, 1945 |

OTHER REFERENCES

Calloway: 17 Chem. Revs. 356 (1935).
Latham et al.: 70 J. A. C. S. 1079 (1948).
Rueggeberg et al.: 38 Ind. & Eng. Chem. 624 (1946).
Reference also on page 425 of Synthetic Org. Chem. by Wagner et al. (1953).